358-190. OR 3,737,572 SR

United States Patent [19]

Frizane et al.

[11] 3,737,572

[45] June 5, 1973

[54] SERIES-CONNECTED POWER SUPPLY AND DEFLECTION CIRCUITS UTILIZING A SINGLE SHUNT REGULATOR

[75] Inventors: Kenneth Frizane, Elmwood Park; William A. Trzyna, Chicago, both of Ill.

[73] Assignee: Zenith Radio Corporation, Chicago, Ill.

[22] Filed: July 23, 1971

[21] Appl. No.: 165,549

[52] U.S. Cl. ........................178/7.3 R, 178/DIG. 11

[51] Int. Cl. ........................H04n 5/44

[58] Field of Search ........................178/7.3 R, 7.5 R, 178/DIG. 11; 315/27 R, 27 TD

[56] References Cited

UNITED STATES PATENTS 3,594,499 7/1971 Sansone et al. ....................178/7.3 R

*Primary Examiner*—Robert L. Griffin
*Assistant Examiner*—George G. Stellar
*Attorney*—John J. Pederson and Donald B. Southard

[57] ABSTRACT

A voltage regulating arrangement in a television receiver for simultaneously regulating the low-voltage power supply and the horizontal deflection system with a single regulator circuit. The regulating arrangement utilizes the horizontal output transformer primary winding as a brightness-dependent variable impedance which, together with the low-voltage (24-volt) power supply load, forms a voltage dividing network between the high-voltage (B+) power supply and ground. A single shunt regulator is coupled across the low-voltage power supply load to insure that a constant potential is maintained at the junction of the variable impedance and the 24-volt load. The 24-volt load and its associated shunt regulator further combine to provide load regulation of the horizontal deflection system by presenting an impedance which varies in a directly proportional manner with impedance variations of the horizontal output transformer primary winding to maintain a relatively constant voltage thereacross.

3 Claims, 2 Drawing Figures

T 5 7
Rm

Inventors
Kenneth Frizane
William A. Trzyna
By [signature]
Attorney

SERIES-CONNECTED POWER SUPPLY AND DEFLECTION CIRCUITS UTILIZING A SINGLE SHUNT REGULATOR

BACKGROUND OF THE INVENTION

The present invention relates generally to improvements in television receivers and more particularly to a voltage regulating arrangement for inclusion therein which is effective to simultaneously regulate a low-voltage (24-volt) power supply and a horizontal deflection system by means of a single regulator circuit.

In a television receiver, an electron beam is scanned across the screen of an image reproducer in a regular fashion by horizontal and vertical deflection coils to reproduce the transmitted image. The horizontal saw-tooth deflection signals applied to the horizontal deflection coils are commonly generated by a deflection circuit employing a deflection amplifier device, i.e., horizontal output transistor, having an output circuit which includes the deflection windings and the primary winding of the horizontal output transformer. As the image reproducer is scanned, the intensity of the electron beam is varied according to variations in the brightness of the reproduced image. Accordingly, as the average-brightness of the reproduced image over one field increases, the requisite beam current increases proportionately thereby demanding that the receiver's high-voltage system deliver an increasing amount of energy. The high-voltage required to generate the requisite beam current is generally developed by rectifying horizontal flyback pulses derived from a tertiary winding on the horizontal output transformer. As the beam current increases, due to increased average-brightness, a proportionately greater amount of energy is drawn from the horizontal output transformer. The increased loading on the tertiary winding which decreases the "Q" or electrical efficiency of the horizontal output transformer is inductively coupled to the primary winding. The equivalent impedance of the primary winding may then be determined by the formula $R = Q\omega_o L$ where $\omega_o$ is the flyback angular frequency. Thus, the increased beam current appears as a decrease in the impedance of the primary winding. If, as in the preferred embodiment of the present invention, the horizontal output transistor and the primary winding of the horizontal output transformer are coupled between an unregulated high-voltage (B+) power supply and ground, a greater current will tend to flow through the primary winding. However, the constant source impedance associated with the B+ supply will present an increasing voltage drop as the current drawn therethrough from the B+ supply increases in response to increased average-brightness. Accordingly, a smaller d-c voltage drop will appear across the primary winding. The resultant current waveform induced in the horizontal deflection windings will decrease in amplitude thereby underscanning the horizontal width of the reproduced image. This effectively changes the ratio of vertical and horizontal deflection amplitudes causing vertical elongation of the reproduced image. Further, the decreased flyback pulses upon being coupled to the tertiary winding will provide a lower high-voltage and, as a consequence, video degradation, such as spot defocusing, will result. Therefore, it has been heretofore recognized that it is essential to maintain the flyback pulses at a relatively constant amplitude in order to maintain the desired, uniform horizontal scan.

Similarly, with regard to variations in power-line voltage, it has been found desirable to regulate the low-voltage (24-volt) power supply which provides operating potential to others of the various television circuits. It will be appreciated that variations in the low-voltage power supply may drastically alter the operating characteristics of the various devices involved thereby proving to have a deleterious effect on the receiver's operation. Previously, there have been several methods of obtaining a regulated low-voltage power supply. For example, one method is to use a separate auto-transformer and regulate the output potential; another is to tap a winding on the sweep transformer, rectify and filter the resultant pulse, and regulate the resultant d-c voltage. The more common method has been to use high-power dropping resistors to step-down the voltage from a higher potential (B+) and again regulating the stepped-down voltage, but this requires a great deal of heat dissipation. All these methods, however, add unnecessary expense to the television receiver.

In any event, to provide both low-voltage power supply regulation and load regulation for the horizontal deflection circuit, it has been found that two separate and distinct power supplies requiring two electronic regulator circuits are needed. It is obvious that such an arrangement is relatively expensive, and adds to the complexity of the circuitry.

SUMMARY OF THE INVENTION

Accordingly, it is an object of the present invention to provide new and improved circuitry for regulating the low-voltage power supply and the horizontal deflection system in a television receiver which overcomes the aforenoted disadvantages and deficiencies of prior circuits.

A more particular object of the invention is to provide an improved voltage regulating arrangement which requires a single regulator circuit to regulate both the low-voltage power supply and the horizontal deflection system.

It is also an object of the invention to provide an improved voltage regulating arrangement which does not require high-power dropping resistors, auto-transformers or the like.

It is a further object of the invention to provide an improved voltage regulating arrangement which provides load regulation for the horizontal deflection system against variations in the average-brightness of the scene to be reproduced.

A still further object of the invention is to provide an improved voltage regulating arrangement which is inexpensive and does not require that a great deal of heat be dissipated.

In accordance with the present invention, a voltage regulating arrangement is provided for regulating both the low-voltage (24-volt) power supply and the saw-tooth current waveform through the horizontal deflection windings with a single regulator circuit. The voltage regulating arrangement of the present invention contemplates the series coupling of the horizontal output transformer primary winding and the low-voltage (24-volt) power supply load between a source of B+ potential and ground. A shunt regulator is coupled across the 24-volt load to maintain a constant potential at the junction of the primary winding and 24-volt load despite variations in line voltage or changes in the average-brightness of the scene to be reproduced. The combined 24-volt load and shunt regulator also provide load regulation for the primary winding against variations in the average-brightness. That is, as the impedance of the primary winding decreases due to increasing average-brightness, the combined impedance will decrease proportionately to maintain a constant voltage across the primary winding.

BRIEF DESCRIPTION OF THE DRAWINGS

The features of the invention which are believed to be novel are set forth with particularity in the appended claims. The invention together with its further objects and advantages thereof, may best be understood, however, by reference to the following description taken in conjunction with the accompanying drawings, in which like reference numerals refer to like elements in the several figures and in which:

PREFERRED EMBODIMENT OF THE INVENTION

Figures 1, 2:
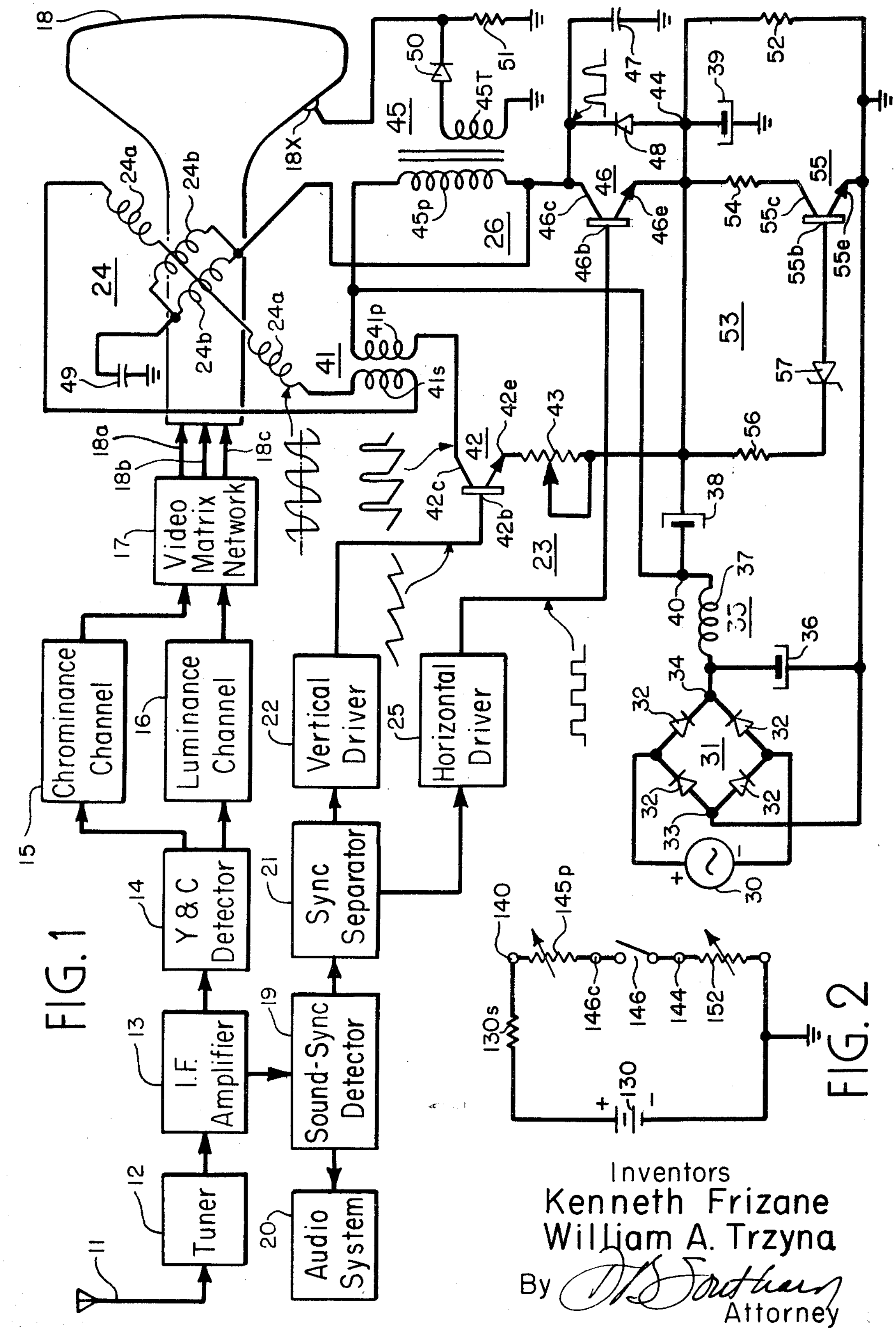
FIG. 1 is a combined schematic and block diagram of a television receiver which includes a voltage regulating arrangement in accordance with a preferred embodiment of the invention.
FIG. 2 is a schematic diagram showing the equivalent d-c current path of the voltage regulating arrangement illustrated in FIG. 1.

Referring now to FIG. 1, a color television receiver is shown which embodies a voltage regulating arrangement in accordance with the present invention. The receiver includes an antenna 11 coupled to an input tuner stage 12 which amplifies the received signal and converts the same to an intermediate-frequency in the well-known manner. The amplified and converted signal is coupled to intermediate-frequency amplifier 13 where it is further amplified and then coupled to luminance (Y) and chrominance (C) detector 14, and also to a sound & sync detector 19. The Y & C detector 14 is connected to a chrominance channel 15 for developing the chrominance signals, which are applied to the video matrix network 17 as one of the informational inputs thereto. Detector 14 is likewise connected to the luminance channel 16 wherein the luminance signals are processed prior to application to the video matrix network 17, forming the other of its informational inputs. Appropriate matrixing occurs within matrix network 17 such that signals containing the correct brightness, hue and color saturation information are derived and applied to the appropriate control electrodes of the image reproducer 18 in a manner understood in the art. The image reproducer 18 may be a conventional shadow mask cathode-ray tube comprising a tri-color image screen or target (not shown) to be selectively scanned by a group of three electron beams developed by individual guns within the tube. In the embodiment of the receiver as herein shown, the color signals R, G and B are applied directly to the cathodes 18*a*, 18*b* and 18*c*, respectively. It should be understood, however, that other systems are equally compatible, such as those receivers designed to utilize color-difference signals. The type of chroma processing is not directly related to the subject matter of the present invention and is in no way critical to its operation.

Sound & sync detector 19, in turn, connects to a Class B audio system 20 having appropriate circuitry for reproducing the audio portion of the received signal. Sound & sync detector 19 further connects to a sync separator 21 wherein the sync portion of the received signal is stripped from the composite video signal. The vertical synchronization pulses developed by the sync separator 21, in turn, are coupled to vertical driver 22 and appropriate vertical signals are developed for application to the vertical output stage 23. Output vertical scanning signals are then applied to the vertical winding 24*a* of deflection yoke 24 positioned about the image reproducer 18. Sync separator 21 also develops horizontal synchronization pulses which are coupled to horizontal driver 25. The horizontal output stage 26 utilizes input signals derived from horizontal driver 25 to develop appropriate scanning signals for application to the horizontal winding 24*b* of deflection yoke 24. Horizontal output stage 26 further develops a high-voltage accelerating potential for application to the second anode 18*x* of the image reproducer 18.

As thus far described, the receiver is conventional in general construction and operation such that further and more particular operational description should not be necessary. More particular consideration, however, may now be given to that portion of the receiver which relates to the preferred embodiment of the present invention, and in general constitutes a voltage regulating arrangement in conjunction with the horizontal output stage and the vertical output stage, identified generally at 26 and 23, respectively.

In the preferred embodiment disclosed in FIG. 1, the 115-volt a-c line voltage represented by source 30 is applied to a conventional full-wave bridge rectifier 31 comprising four serially connected diodes 32 disposed to form a closed loop. One output junction 33 is coupled directly to ground while the second output junction 34 is coupled to the input of a $\pi$ filter 35. The filter 35, comprised of the parallel connection of capacitor 36 with a network formed by the series connection of inductor 37, capacitor 38 and capacitor 39 between output junction 34 and ground, serves to develop a source of d-c potential (B+) at the junction 40 of inductor 37 and capacitor 38. The B+ potential is, in turn, coupled through the primary winding 41*p* of vertical output transformer 41 to the collector electrode 42*c* of vertical output transistor 42 for providing an operating potential thereto. The emitter electrode 42*e* is coupled through the vertical size pot 43 to the low-voltage (24-volt) power supply which, as will be shown later, is developed at the junction 44 of capacitors 38 and 39. Accordingly, input signals derived from vertical driver 22 and applied directly to the base electrode 42*b* develop an output voltage, illustrated in FIG. 1, at the vertical output collector 42*c*. This output voltage is, in turn, inductively coupled by primary 41*p* to the vertical output transformer secondary 41*s*. The output terminals of secondary 41*s* are coupled to the respective terminals of the serially connected vertical deflection windings 24*a* wherein the illustrated sawtooth yoke current is developed for deflecting the beam current developed by the image reproducer 18 in the vertical direction across its screen.

The B+ potential developed at junction 40 is further applied to the collector electrode 46*c* of horizontal output transistor 46 through the primary winding 45*p* comprising horizontal output transformer 45. The emitter electrode 46*e* of transistor 46 is connected to junction 44. When horizontal drive pulses, such as those shown in FIG. 1, are coupled from the horizontal driver 25 to its base electrode 46*b*, the horizontal output transistor 46 is rendered conductive. As the transistor is switched "ON," current through the primary winding 45*p* increases as does current through the horizontal deflection windings 24*b* which are connected to the collector electrode 46*c*. The increasing current through the deflection windings 24*b* deflects the electron beam from the center to the right side of the image reproducer 18. Upon reaching the right edge of the screen, the transistor 46 is switched "OFF" by the negative portion of the drive pulses on the base electrode **46*b*. This generates a rapid change in flux within the core of the horizontal output transformer 45** which induces a high reactive voltage, or flyback pulse, in the windings thereof. A tertiary winding 45*t* is provided to "step-up" the flyback pulse produced across the primary winding **45*p*. The "stepped-up" pulse is then rectified by diode 50** to produce a high-voltage accelerating potential at the cathode thereof for application to the second anode 18*x*. A bleeder resistor 51 is also included from the cathode of diode 50 to ground. The flyback pulse developed across the primary winding **45*p* is further applied to the horizontal deflection windings 24*b*** for reversing the current therethrough in order to move the electron beam from the right side of the screen to the left side.

Immediately following the flyback or retrace interval, transistor 46 remains non-conductive, but the combined inductances of the horizontal deflection windings **24*b*** and the primary winding 45*p* join with inherent circuit capacitances and capacitor 47 to force the voltage at collector electrode 46*c* into a ringing or oscillatory mode. This action forces the voltage at collector electrode **46*c* to move in a negative direction relative to the constant potential at junction 44 until the damper diode 48** becomes forward-biased and clamps the potential at collector electrode 46*c* to a constant level thereby clipping the ringing voltage. The inductive energy stored in the horizontal deflection windings 24*b* is then discharged through the horizontal deflection windings **24*b* and the damper diode 48 to produce an increasing linear current change through the horizontal deflection windings 24*b* thereby moving the electron beam from the left side of the screen to the center. Capacitor 49, which couples the horizontal deflection windings 24*b*** to ground and in addition to blocking d-c current therethrough, provides "S" shaping to the current waveform. The cycle is repeated as described above when transistor 46 is switched "ON" by the next horizontal drive pulse.

The parallel arrangement of the vertical and horizontal output stages 23 and 26, respectively, combine to provide a variable dropping impedance between junction 40 where the B+ potential is developed and the low-voltage power supply at junction 44. Such impedance variations are primarily due to beam current variations resulting from changes in the average-brightness of the scene to be reproduced. Since the vertical output stage 23 is not too susceptible to brightness variations, it will have minimal effect on the apparent changes in dropping impedance. Its main function, besides furnishing vertical deflection, is to help the horizontal output stage 26 provide the large currents required by the Class B audio system 20 of the preferred embodiment. As was previously noted, however, the horizontal output stage 26 presents an impedance which varies inversely with changes in beam current. That is, when the average-brightness increases towards maximum, its equivalent impedance decreases.

The equivalent impedance of the horizontal output transformer primary winding 45*p* is further serially coupled to ground through the low-voltage power supply load, which is represented by load resistance 52 connected between junction 44 and ground. Resistance 52 may comprise, for example, the input to the Class B audio system 20, the IF amplifier 13, and the tuner 12. Thus, a voltage dividing network is formed which by careful selection of components insures that an unregulated 24-volt supply appears at the junction 44. It is apparent, however, the impedance variations in the primary winding 45*p* due to changes in scene content will vary the voltage found at junction 44. Since it is desirable to make provision for a constant 24-volt supply regardless of changing line voltage or scene content, a shunt regulator 53 is included across the low-voltage load 52 from junction 44 to ground. The shunt regulator 53 includes a resistor 54 coupled between the junction 44 and the collector electrode 55*c* of a regulator transistor 55. The emitter electrode 55*e*, in turn, is coupled to ground. A resistor 56 is connected in series with a Zener diode 57 between junction 44 and the base electrode 55*b* of regulator transistor 55. Zener diode 57, in effect, subtracts a constant voltage from the potential appearing at junction 44 and applies the remaining voltage to base electrode 55*b*. When the potential at junction 44 tends to decrease due to a decrease in the line potential from source 30 or an increase in the equivalent impedance of the primary winding 45*p* (decreasing average-brightness), the decrease in potential at junction 44 is translated to the base electrode **55*b* thereby decreasing the current conducted through regulator transistor 55. The resultant increased output impedance of regulator transistor 55 shunts more current through the load resistor 52 thereby tending to increase the potential of the low-voltage power supply at junction 44. Conversely, as the potential at junction 44 increases due to a high average-brightness scene or an increase in potential at source 30, regulator transistor 55 will conduct more current to ground and thus reducing the current conducted through load resistor 52**. This, in turn, tends to decrease the voltage at junction 44 in order to correct for the oroginal change. It is apparent that in either case the effect of shunt regulator 53 is to stabilize the d-c voltage appearing at junction 44.

The parallel combination of the shunt regulator 53 and the low-voltage power supply load represented by resistance 52 further provides improved load regulation for the horizontal output stage 26. As previously mentioned, it is essential that the amplitude of the horizontal flyback pulses at collector electrode **46*c*** remain relatively constant if a uniform horizontal scan is to be maintained. To accomplish this, emitter electrode 46*e* is coupled to the regulated low-voltage (24-volt) power supply at junction 44. Here, the shunt regulator 53 and the low-voltage load resistance 52 combine, for d-c considerations, to present a variable resistance exhibiting resistance changes that are inversely proportional to variations in the current flowing through the primary winding **45*p*** as a result of fluctuations in the average-brightness. Thus, as the impedance of primary winding 45*p* decreases due to a high average-brightness scene, the impedance of the aforementioned combination also decreases in a directly proportional manner to maintain a nearly constant d-c voltage across primary winding **45*p***. This action is perhaps best understood by reference to FIG. 2 which shows the d-c current path for the horizontal output stage 26 of the preferred embodiment. This includes a variable resistor 145p representing the impedance of the horizontal output transformer primary winding 45p, a switch 146 representing horizontal output transistor 46, and a second variable resistor 152 representing the combined impedance of shunt regulator 53 and the low-voltage load resistance 52. If it is assumed that an idealized B+ source 130 is available, i.e., infinite current can be drawn at a constant potential with no source impedance, then the voltage across the variable primary resistance 145p will vary only slightly because the corresponding variation of load resistor 152 tends to maintain a constant potential at junction 144. Accordingly, the amplitude of the flyback pulses at junction 146c remains relatively constant such that the current through the horizontal deflection windings 24b is unchanged. Accordingly, there is no noticeable change in the horizontal width. However, in practice, there is a source resistance 130s associated with the B+ source 130 which inserts a small variable voltage drop between the B+ source 130 and the primary resistance 145p corresponding to current variations caused by changes in scene content. The voltage across the variable primary resistance 145p will decrease slightly as the voltage drop across the source resistance 130s increases. It is apparent, therefore, that the degree of voltage regulation across the primary resistance 145p for average-brightness variations depends upon minimizing the fixed resistance between the source 130 and ground. This can be accomplished most effectively by utilizing the variable primary resistance 145p as a dropping impedance thereby eliminating the need for fixed, high-power dropping resistors. When serially coupled with the directly proportional varying impedance of low-voltage resistance 152, the need for any fixed resistances between source 130 and ground is totally eliminated.

Accordingly, an inexpensive method of obtaining both a regulated low-voltage (24-volt) power supply and improved load regulation of the horizontal deflection system with a single regulator circuit has been shown. While a particular embodiment of the present invention has been shown and described, it will be obvious to those skilled in the art that various changes and modifications may be made without departing from the invention in its broader aspects. Accordingly the aim in the appended claims is to cover all such changes and modifications as may fall within the true spirit and scope of the invention.

We claim:

1. A voltage regulating arrangement in a television receiver for simultaneously regulating a low voltage power supply and a horizontal deflection system with a single regulator means comprising:

a low voltage DC terminal, a source of B+ potential higher than the voltage on said low voltage DC terminal, and a plane of reference potential;

a horizontal output transistor;

a horizontal output transformer having a primary winding connected as the series load for said transistor, the series-combination of said transistor and said primary winding being connected between said source of B+ potential and said terminal;

a low voltage load coupled between said terminal and said plane of reference potential; and a shunt regulator including variable impedance means connected across said low voltage load for maintaining the potential thereacross constant, said variable impedance means and said low voltage load further providing a resistance varying in a directly proportional manner with impedance variations of said horizontal output transfomer primary winding, resulting from current variations therein, for stabilizing the voltage drop across said horizontal output transformer primary winding.

2. A voltage regulating arrangement in accordance with claim 1 wherein said shunt regulator comprises a transistor exhibiting a variable output impedance dependent on the level of current conducted from said terminal to its base electrode by means of a Zener diode.

3. A voltage regulating arrangement in accordance with claim 2 wherein said television receiver includes a vertical deflection transformer and driver transistor coupled in parallel with said horizontal output transformer primary winding to assist in maintaining the proper level of current through said resistance.

* * * * *